United States Patent
Doi et al.

(10) Patent No.: US 6,697,370 B1
(45) Date of Patent: Feb. 24, 2004

(54) BANDWIDTH CONTROL METHOD OF PACKET DATA IN PACKET SWITCHING NETWORK AND PACKET SWITCHING NETWORK SYSTEM

(75) Inventors: Tokuro Doi, Kanagawa (JP); Masatomo Nakano, Kanagawa (JP); Motoshi Tamura, Kanagawa (JP); Teruki Niwa, Kanagawa (JP)

(73) Assignee: NTT DoCoMo Inc., Tokyo (JP)

( * ) Notice: Subject to any disclaimer, the term of this patent is extended or adjusted under 35 U.S.C. 154(b) by 0 days.

(21) Appl. No.: 09/343,488

(22) Filed: Jun. 30, 1999

Related U.S. Application Data

(63) Continuation of application No. PCT/JP98/04922, filed on Oct. 30, 1998.

(30) Foreign Application Priority Data

Oct. 30, 1997 (JP) .............................................. 9-299220

(51) Int. Cl.[7] .............................................. H04L 12/28
(52) U.S. Cl. .............................. 370/395.21; 370/395.43
(58) Field of Search .............................. 370/395.1, 229, 370/230, 231, 233, 234, 235, 237, 253, 353, 397, 399, 395.2, 395.21, 395.3, 395.32, 395.41, 395.43, 401, 402, 403, 409, 437, 465, 468, 477

(56) References Cited

U.S. PATENT DOCUMENTS

| | | | | |
|---|---|---|---|---|
| 5,579,312 | A | * 11/1996 | Regache | 370/397 |
| 5,936,958 | A | * 8/1999 | Soumiya et al. | 370/395.43 |
| 5,982,748 | A | * 11/1999 | Yin et al. | 370/232 |
| 6,075,772 | A | * 6/2000 | Brown et al. | 370/235 |
| 6,097,722 | A | * 8/2000 | Graham et al. | 370/395.21 |
| 6,141,329 | A | * 10/2000 | Turner | 370/261 |
| 6,148,001 | A | * 11/2000 | Soirinsuo et al. | 370/395.4 |

FOREIGN PATENT DOCUMENTS

| | | | |
|---|---|---|---|
| JP | 5-304541 | 11/1993 | |
| JP | 7-154397 | 6/1995 | |
| JP | 8-65342 | 3/1996 | |
| JP | 8-251177 | 9/1996 | |
| JP | 10028123 A | 1/1998 | ........... H04L/12/28 |
| KR | 1996-20165 | 6/1996 | |
| WO | 97-04564 | 2/1997 | |

OTHER PUBLICATIONS

Canadian Office Action for app. No. 2,276,417, May 24, 2002.
Japanese Office Action dated Nov. 13, 2001 with English translation for Japanese Patent Application No. 9–299220.
International Search Reports (Both in English and Japanese) for International Application No. PCT/JP98/04922, with search reports mailed Feb. 2, 1999.

* cited by examiner

*Primary Examiner*—Douglas Olms
*Assistant Examiner*—Phirin Sam
(74) *Attorney, Agent, or Firm*—Workman Nydegger

(57) ABSTRACT

Efficient use of an ATM transmission path becomes possible by multiplexing, into a bandwidth in the bandwidth-assured individual VP, a plurality of users whose traffic volumes are beyond a predetermined value. Installing a bandwidth-unassured common VP for low traffic users makes it possible to switch from the common VP to the individual VP or vice versa under the following conditions. (1) When the user traffic volume, monitored at fixed intervals during the communications through an individual VP, drops below a predetermined threshold value, the individual VP is switched to a common VP. (2) When the user traffic volume, monitored at fixed intervals during the communications through a common VP, exceeds a predetermined threshold value, the common VP is switched to an individual VP. (3) In addition to condition (2), when bandwidth shortage takes place in common VPs, the common VPs of heavy traffic users are switched to individual VPs.

16 Claims, 3 Drawing Sheets

BANDWIDTH CONTROL METHOD OF PACKET DATA IN PACKET SWITCHING NETWORK AND PACKET SWITCHING NETWORK SYSTEM

This application is a continuation application under 35 U.S.C. 365(c) of PCT International Application Number PCT/JP98/04922 filed Oct. 30, 1998, which claims priority to Japanese patent application serial number 299,220/1997 filed Oct. 30, 1997.

TECHNICAL FIELD

The present invention relates to a bandwidth control method of packet data in a packet switching network and a packet switching network system.

BACKGROUND ART

Packet transfer technique in a conventional fixed network can be divided into the following two types of packet communications methods.
[1] Common path multiplex communications method.
[2] Individual path communications method.

The common path multiplex communications method installs between packet switching nodes transmission links common to a plurality of packet users in advance, and multiplexes into the common links packets which include address information of individual users, thereby transferring the packets between the nodes. Extracting the packets from the common links, a receiving node refers to the addresses of the individual users, and multiplexes again into the common links of the output transmission paths corresponding to the addresses. Thus, the user packets are successively transferred to a destination node, and then to destination party terminals.

As an example of the common path multiplex method, there is a method such as packet switching or frame relay, which usually multiplexes the user packets into physical links with a particular bandwidth. In the ATM (Asynchronous Transfer Mode) transmission, there is a method of multiplexing user packets into VP (Virtual path) links with a particular bandwidth, or into VC (Virtual Channel) links as in AAL-2 (ATM Adaptation Layer type 2), in which case, equipment for multiplexing into the common links usually uses FIFO without carrying out bandwidth assurance.

The individual path communications method establishes between the packet switching nodes transmission links with their bandwidth assured for individual packet users, thereby carrying out routing.

The packet switching nodes each execute witching so that individual link is established between the nodes for each user, thus extending to the destination party terminals.

As a typical example of the individual path communications method, there is a packet communication method employing STM (Synchronous Transfer Mode) transmission or bandwidth assured ATM transmission.

Considering the two packet communications methods, the common path multiplex communications method possesses an advantage of a high transmission efficiency because a plurality of users can utilize the bandwidth of a particular set of common packet links in a statistically multiplexed manner. The common path multiplex communications method, however, can offer only best-efforts services because the packet communication rates of individual users are restricted by the communication state of the other users multiplexed into the same common packet links.

The individual path communications method is just the opposite of the common path multiplex communications method, offering an advantage of being able to assure the communications bandwidths of the individual users because of a dedicated packet link provided to each user. However, it has an disadvantage of impairing the transmission efficiency because the resources assigned to the individual users are unavailable to the other users, and particularly because the division loss takes place in the variable rate transmission in which the resources are assigned in such a manner that the users have the maximum bandwidth each.

SUMMARY OF THE INVENTION

As described above, the conventional common path multiplex communications method has a disadvantage that the packet communication rates of individual users are restricted by the communication state of the other users because of the multiplexing into the same common packet links. In contrast with this, although the individual path communications method assures the communications bandwidths of the individual users, it has a disadvantage of impairing the transmission efficiency because the resources assigned to the individual users are unavailable to the other users.

The present invention was achieved to solve the foregoing problems. Therefore, it is an object of the present invention to provide a bandwidth control method of packet data in a packet switching network and a packet switching network system that can ensure desired bandwidths for the users by switching between bandwidth-assured transmission connections and bandwidth-unassured transmission connections, and that can efficiently operate the transmission paths in the network.

In the first aspect of the present invention, there is provided a bandwidth control method of packet data in a packet switching network for switching, in a packet switching network for transmitting packet data, a transmission connection for transmitting the packet data, the bandwidth control method comprising:

a monitoring step of monitoring a communication traffic volume of the packet data in the packet switching network; and a switching step of switching, in response to a result obtained by comparing the communication traffic volume with a predetermined threshold value, the transmission connection between a bandwidth-assured transmission connection which ensures a communication bandwidth for each user terminal equipment transmitting the packet and a bandwidth-unassured transmission connection which does not ensure the communication bandwidth.

Here, the packet switching network may be an ATM switching network, the bandwidth-assured transmission connection which ensures the communication bandwidth for each user terminal equipment transmitting the packet may be a connection established in a VC in an individual VP or in an individual VC group, and the bandwidth-unassured transmission connection may be a connection established in a VC in a common VP or in a common VC group;

the monitoring step may monitor the communication traffic volume of the packet data of the user terminal equipment in the ATM switching network; and the switching step may switch, in response to the result obtained by comparing the communication traffic volume of the packet data of the user terminal equipment with the predetermined threshold value, the transmission connection used by the user terminal equipment between the VC in the individual VP or in the individual VC group and the VC in the common VP or in the common VC group.

The monitoring step may comprise a measuring step of measuring the communication traffic volume; and the switching step may comprise the steps of:

comparing, when the connection of the user terminal equipment is the VC in the individual VP or in the individual VC group, the communication traffic volume obtained at the monitoring step with a first predetermined threshold value, and issuing, when the communication traffic volume is less than the first predetermined threshold value, a command to change the connection used by the user terminal equipment from the VC in the individual VP or in the individual VC group to the VC in the common VP or in the common VC group;

comparing, when the connection used is the VC in the common VP or in the common VC group, the communication traffic volume obtained at the monitoring step with a second predetermined threshold value, and issuing, when the communication traffic volume is greater than the second predetermined threshold value, a command to change the connection used by the user terminal equipment from the VC in the common VP or in the common VC group to the VC in the individual VP or in the individual VC group; and changing the connection used by the user terminal equipment in response to the commands of the steps of issuing the commands to change.

The monitoring step may further comprise a common VP or common VC group bandwidth monitoring step of measuring during communications a total traffic volume of users in the common VP or in the common VC group, or of measuring an idle capacity in the common VP or in the common VC group; and the switching step may further comprise a step of changing, when a result of the common VP or common VC group bandwidth monitoring step indicates that the bandwidth of the common VP or of the common VC group tightens, the connection of a user whose traffic is rather heavy in the common VP from the VC in the common VP or in the common VC group to the VC in the individual VP or in the individual VC group.

The ATM switching network may be a mobile network comprising a base station to which the user terminal equipment is connected, a switching center to which the base station is connected, a gateway center to which the switching center is connected, and terminal equipment of an external network connected to the gateway center, and wherein the bandwidth control method may further comprise the steps of:

establishing, when the user terminal equipment originates an outgoing call, a connection in the VC in the individual VP or individual VC group, or in the VC in the common VP or in the common VC group, between the base station in a visitor location of the user terminal equipment and the gateway center through the switching center; and establishing, when the user terminal equipment terminates an incoming call, a connection in the VC in the individual VP or individual VC group, or in the VC in the common VP or in the common VC group, between the gateway center and the base station to which the user terminal equipment is connected in accordance with a location of the user terminal equipment, the location being registered by the user terminal equipment.

The step of measuring the communication traffic volume may start a new measurement when the visitor location base station is changed by roaming of the user terminal equipment.

A VC in the common VP or in the common VC group may be used when originating an outgoing call from the user terminal equipment, or when terminating an incoming call from an external ATM switching network.

In the second aspect of the present invention, there is provided a packet switching network system for switching, in a packet switching network for transmitting packet data, a transmission connection for transmitting the packet data, the packet switching network system comprising:

monitoring means for monitoring a communication traffic volume of the packet data in the packet switching network; and switching means for switching, in response to a result obtained by comparing the communication traffic volume with a predetermined threshold value, the transmission connection between a bandwidth-assured transmission connection which ensures a communication bandwidth for each user terminal equipment transmitting the packet and a bandwidth-unassured transmission connection which does not ensure the communication bandwidth.

Here, the packet switching network may be an ATM switching network, the bandwidth-assured transmission connection which ensures the communication bandwidth for each user terminal equipment transmitting the packet may be a VC in an individual VP or in an individual VC group, and the bandwidth-unassured transmission connection may be a VC in a common VP or in a common VC group, and wherein the packet switching network system comprises:

monitoring means for monitoring the communication traffic volume of the packet data of the user terminal equipment in the ATM switching network; and packet switching means for processing the packet data of the user terminal equipment, the packet switching means switching, in response to the communication traffic volume, the transmission connection used by the user terminal equipment between the VC in the individual VP or in the individual VC group and the VC in the common VP or in the common VC group.

The monitoring means may comprise:

measuring means for measuring the communication traffic volume of the packet data of the user terminal equipment;

state managing means for holding, for each user terminal equipment, VP or VC group types used by the user terminal equipment; and change direction means for comparing, when the connection type of the user terminal equipment the state managing means holds is the individual VP or the individual VC group, the communication traffic volume with a first predetermined threshold value, and issuing, when the communication traffic volume is less than the first predetermined threshold value, a command to change a connection setting used by the user terminal equipment from the VC in the individual VP or in the individual VC group to the VC in the common VP or in the common VC group, and comparing, when the connection type of the user terminal equipment the state managing means holds is the common VP or in the common VC group, the communication traffic volume with a second predetermined threshold value, and issuing, when the communication traffic volume is greater than the second predetermined threshold value, a command to change the connection setting used by the user terminal equipment from the VC in the common VP or in the common VC group to the VC in the individual VP or in the individual VC group, and wherein the packet switching means may comprise means for changing the connection-used by the user terminal equipment in response to the commands of the change direction means.

The monitoring means may further comprise common VP or common VC group bandwidth monitoring means for measuring during communications a total traffic volume of users in the common VP or in the common VC group, or for measuring an idle capacity in the common VP or in the common VC group; and the packet switching means may further comprise means for changing, when a result of the common VP or common VC group bandwidth monitoring means indicates that the bandwidth of the common VP or of the common VC group tightens, the connection of a user whose traffic is rather heavy in the common VP from the VC in the common VP or in the common VC group to the VC in the individual VP or in the individual VC group.

The ATM switching network may-be a mobile network comprising:

a gateway center for connecting the ATM switching network with an external ATM switching network, and for identifying user terminal equipment of the ATM switching network from packet data sent from the external network; and service control means for location registration of the user terminal equipment, and wherein the packet switching means may further comprise means for establishing, from a location provided from the service control means, in the VC in the individual VP or individual VC group, or in the VC in the common VP or in the common VC group, a connection between a base station connected to the user terminal equipment and the gateway center in the ATM switching network.

The means for measuring the communication traffic volume may comprise means for starting a new measurement when the visitor location base station is changed by roaming of the user terminal equipment.

The packet switching means may use a VC in the common VP or in the common VC group when an outgoing call occurs from the user terminal equipment, or when an incoming call takes place from the external ATM switching network.

BEST MODE FOR CARRYING OUT THE INVENTION

The present invention will now be described with reference to the accompanying drawings, in which embodiments of the present invention are described separately with a fixed network and a mobile network in the packet communications network.

EMBODIMENT 1 (IN THE CASE OF FIXED NETWORK)

In the present embodiment 1, descriptions will be successively provided for a network configuration, communication establishment and switching method in connection with network channel control procedure in an ATM switching network on a fixed network.

[NETWORK CONFIGURATION]

Figure 1:
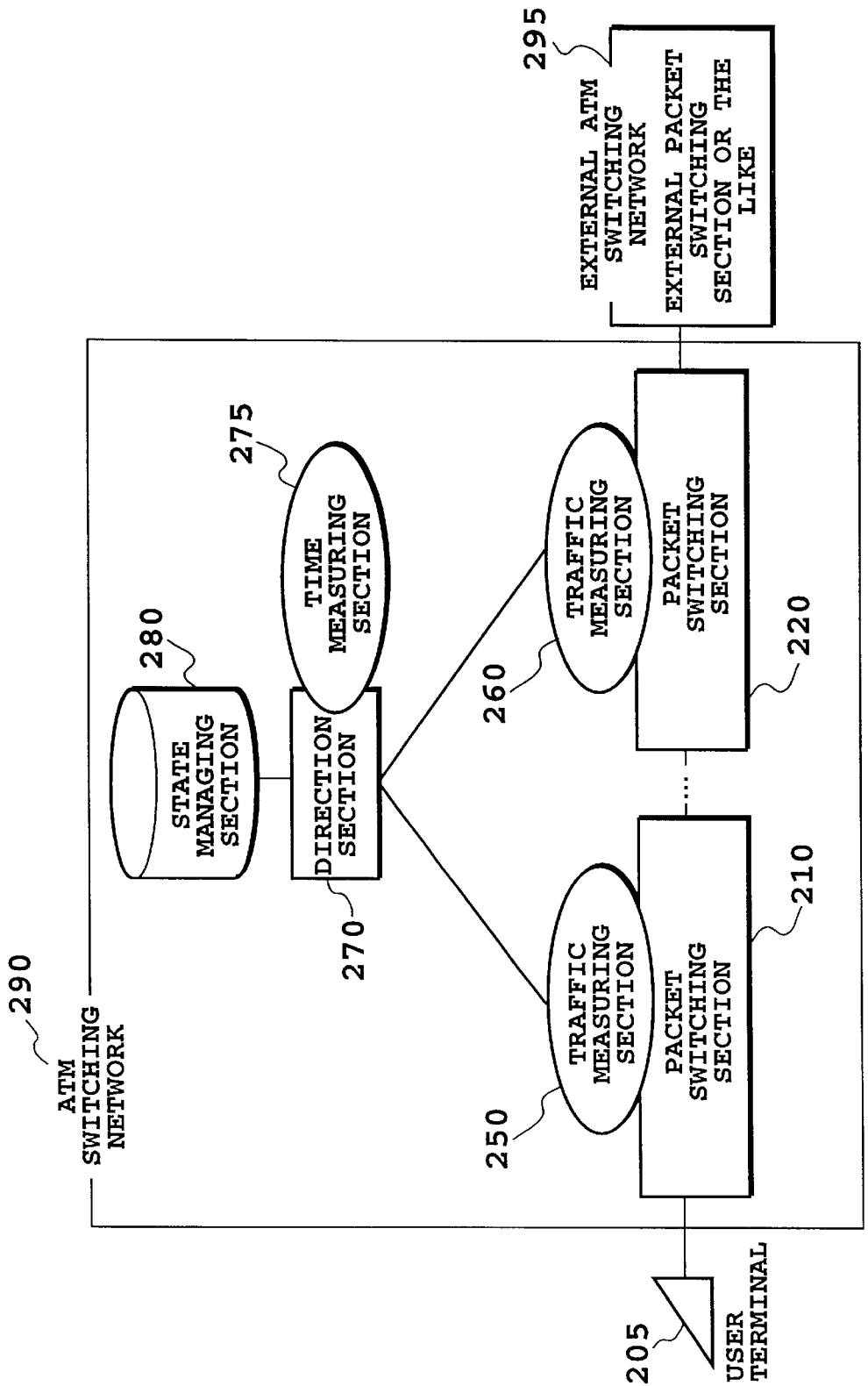
FIG. 1 is a block diagram showing a fixed packet switching network.

FIG. 1 shows a fixed packet switching network. In FIG. 1, packet switching sections 210, 220 and the like each process the packet data from a user terminal 205, and can possess ATM transmission functions that are applicable to ATM switching networks 290 and 295. The packet switching sections 210, 220 and the like can include as their integral parts the function of traffic measuring sections 250, 260 and the like for measuring the packet data volumes and the function of individual/common VP switching sections (which will be described later). Here, as a device for measuring the packet data volume, a device is applicable which can constantly measure the traffic volumes of the user packet data per unit time period.

A direction section 270 decides and designates VPs to be used by comparing the results fed from the packet switching sections 210, 220 and the like with the present user state in a state managing section 280. The user VPs to be used include both bandwidth-assured individual VPs and bandwidth-unassured common VPs in the ATM transmission paths, which can be switched from the common VP to the individual VP or vice versa for each user in a particular condition. The VP currently assigned to each user is recorded in the state managing section 280.

Providing the packet switching sections 210, 220 and the like with a command to measure traffic volumes of individual users and with instructions about the VP types to be used, the direction section 270 commands a time measuring section 275 constituting its integral part to start and reset a timer, and provides the state managing section 280 with inquiry about and rewrite of the user state.

The state managing section 280, which is a database for storing the VCs and VPs assigned to the users, loads or updates the contents of the database in accordance with the command from the direction section 270.

[COMMUNICATION ESTABLISHMENT]

Assuming that the users complete their communication establishment in advance, description of a communication establishment procedure employed in the network will be omitted in the present specification.

The VP types to be used must be set in advance as an initial value in the communication establishment stage. The individual/common VPs are determined as the initial values considering the characteristics of the network traffic or the characteristics of user applications. In the present specification, it is assumed that the initial VP type is the common VP.

[SWITCHING FROM INDIVIDUAL VP TO COMMON VP DURING COMMUNICATIONS]

Receiving a notification of the time over from the time measuring section 275 during the communication, the direction section 270 commands the traffic measuring sections 250, 260 and the like in the packet switching sections 210, 220 and the like to measure the user packet traffic. The traffic measuring sections 250, 260 and the like returns the measured results to the direction section 270 which in turn inquires of the state managing section 280 about the user state.

When a user VP is an individual VP, the direction section 270 compares the measured traffic volume with the user state, and if the measured traffic is less than a threshold value even though the user employs the individual VP, the user VP is changed from the individual VP to a common VP.

When the common VP is used, the transmission connection of the user must be identified by the VC because ATM packets of a plurality of users are transferred through a single VP. Alternatively, in a special mode of the common VP which transfers packets of a plurality of users through a single VC as in the AAL-2, the transmission connection of each user can be identified by an ID (CID: composite user ID) assigned to the user. Switching between the three identifiers, an identifier VCd (dedicated VC) of the transmission connection used in the individual VP, an identifier VCm (multiplexing VC) of the transmission connection used when switched to the common VP, and the user identifier CID in the case of the AAL-2, can be implemented using some conversion logic or conversion table.

As one of the simplest examples, assigning the same identifier as the VCd and VCm (and as the CID) of the individual VP and the common VP enables switching from the individual VP to the common VP by only switching the value of the VP (switching to the AAL-2 is made by adding VCs for the AAL-2 and by reading the VCd as the CID). Switching from the common VP to the individual VP are implemented in the same manner.

[SWITCHING FROM COMMON VP TO INDIVIDUAL VP DURING COMMUNICATIONS]

Receiving a notification of the time over from the time measuring section 275 during the communication, the direction section 270 commands the traffic measuring sections 250, 260 and the like in the packet switching sections 210, 220 and the like to measure the user packet traffic. The traffic measuring sections 250, 260 and the like returns the measured results to the direction section 270 which in turn inquires of the state managing section 280 about the user state.

When a user VP is a common VP, the direction section 270 compares the measured traffic volume with the user state, and if the measured traffic exceeds a threshold value, the user VP is changed from the common VP to an individual VP.

As a trigger for switching from the common VP to the individual VP, a fact is applicable that the bandwidth of the common VP tightens because of an increase in the traffic of the current users in the common VP, in which case, it is possible to switch to the individual VP beginning from the users employing greater bandwidth in the common VP.

EMBODIMENT 2 (IN THE CASE OF MOBILE NETWORK)

In the present embodiment 2, descriptions will be successively provided for a network configuration, communication establishment and switching method in connection with network channel control procedure in an ATM switching network of a mobile network.

[NETWORK CONFIGURATION]

Figure 2:
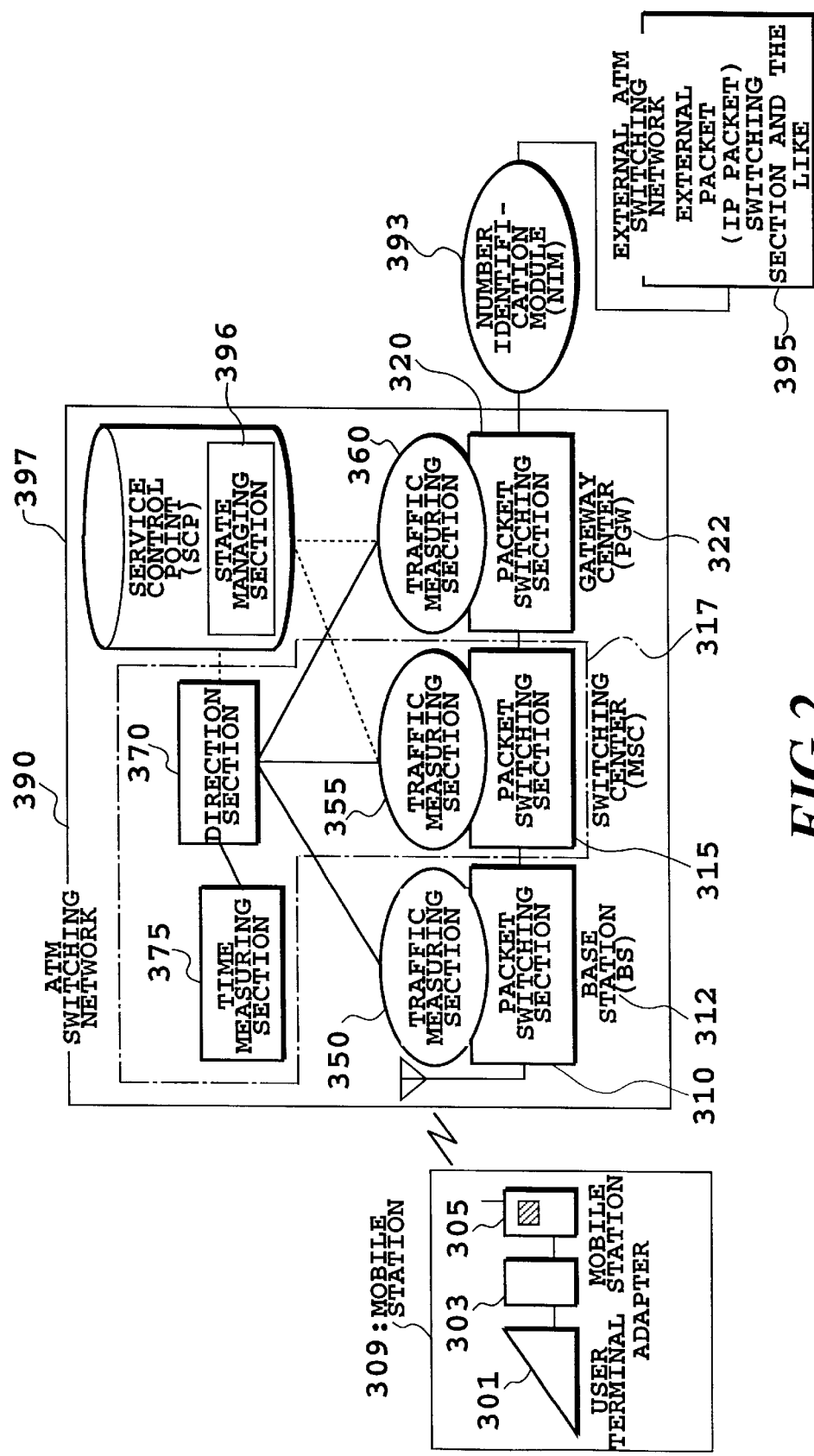
FIG. 2 is a block diagram showing a mobile packet communications network.

FIG. 2 shows a mobile packet communications network. In contrast with the fixed packet switching network as shown in FIG. 1, the mobile packet communications network as shown in FIG. 2 comprises a function to carry out location registration of users (including location registration involved not only in the reception waiting state, but also in the change of the current communication path), and further comprises a service control point (SCP) 397. Furthermore, it comprises a number identification module (NIM) 393 for identifying the IP packets received from the outside of the mobile packet communications network, and for identifying the numbers of mobile stations (mobile station 305, for example) used for identifying users in the mobile packet communications network. In the present embodiment 2, the service control point 397 includes a state managing section 396 having the same functions as the state managing section 280 has.

[INITIAL COMMUNICATION ESTABLISHMENT AND OUTGOING CALL ON MOBILE SIDE]

A mobile station 309 sends a packet communication start request signal to a mobile switching center (MSC) 317 through a visitor location base station (BS) 312. The mobile station 309 comprises a user terminal 301, an adapter 303 and a mobile station 305. The-MSC 317 analyzes and decides the destination from the received signal, and establishes paths up to a gateway center (PGW) 322 to which a destination party is connected. The analysis and decision of the destination can be implemented either by providing the MSC 317 with the data for the analysis, or by providing the data to the SCP, of which the MSC 317 inquires.

The initial VP types to be prepared by the ATM network in this case are selected considering the characteristics of the initial configuration of the network. For example, when a decision is made that the VP resources must be saved because of the insufficient bandwidth between the BS 312 and MSC 317, the common VPs are adopted as the initial setting. In contrast, to avoid tightening user traffic, the individual VPs should be adopted as the initial VPs.

[INITIAL COMMUNICATION ESTABLISHMENT AND INCOMING CALL TO MOBILE STATION]

The mobile station 309 in the waiting state regularly monitors a paging channel sent from the base station 312, and identifies the location area to which the base station 312 that provides the best receiving state belongs. The mobile station 309 sends, every time it enters a new location area, a location registration request to the SCP 397 through the visitor location BS 312 and MSC 317.

Receiving a communication start request signal, the gateway center 322 identifies the number of the mobile station 305 from the packet address received, and inquires of the SCP 397 about the location area to which the mobile station 309 belongs. Thus, it can implement the paging of the mobile station 309 through the MSC 317 and the BS 312.

The VP types used in the ATM networks 390 and 395 are selected considering the characteristics of the initial configuration of the network. For example, when a decision is made that the VP resources must be saved because of the insufficient bandwidth between the BS 312 and MSC 317, the common VPs are adopted as the initial setting. In contrast, to avoid tightening user traffic, the individual VPs should be adopted as the initial setting.

[SWITCHING FROM INDIVIDUAL VP TO COMMON VP DURING COMMUNICATIONS]

Receiving a notification of the time over from a time measuring section 375 during the communication, a direction section 370 commands at least one of traffic measuring sections 350, 355, 360 and the like in packet switching sections 310, 315, 320 and the like to measure the user packet traffic. The traffic measuring sections 350, 355, 360 and the like return the measured results to the direction section 370 which in turn inquires of a state managing section 396 about the user state. Alternatively, the traffic measurement request can be sent out using the path change in the ATM network 390 as a trigger, because when the visitor location BS 312 is changed due to the roaming of the mobile station 309, switching of the VP must be decided depending on the traffic state of a new path in the new base station. This depends on the network configuration.

When a user VP is an individual VP, the direction section 370 compares the measured traffic volume with the user state, and if the measured traffic is less than a threshold value even though the user employs the individual VP, the user VP is changed from the individual VP to a common VP.

When the common VP is used, the transmission connection of the user must be identified by the VC because ATM packets of a plurality of users are transferred through a single VP. Alternatively, in a special mode of the common VP which transfers packets of a plurality of users through a single VC as in the AAL-2, the transmission connection of each user can be identified by an ID (CID: composite user ID) assigned to the user. Switching between the three identifiers, an identifier VCd (dedicated VC) of the transmission connection used in the individual VP, an identifier VCm (multiplexing VC) of the transmission connection used when switched to the common VP, and the user identifier CID in the case of the AAL-2, can be implemented using some conversion logic or conversion table. As one of the simplest examples, assigning the same identifier as the VCd and VCm (and as the CID) of the individual VP and the common VP enables switching from the individual VP to the common VP by only switching the value of the VP (switching to the AAL-2 is made by adding VCs for the AAL-2 and by reading the VCd as the CID). Switching from the common VP to the individual VP are implemented in the same manner.

[SWITCHING FROM COMMON VP TO INDIVIDUAL VP DURING COMMUNICATIONS]

Receiving a notification of the time over from the time measuring section 375 during the communication, the direction section 370 commands at least one of the traffic measuring sections 350, 355, 360 and the like in the packet switching sections 310, 315, 320 and the like to measure the user packet traffic. The traffic measuring sections 350, 355, 360 and the like return the measured results to the direction section 370 which in turn inquires of the state managing section 396 about the user state. Alternatively, the traffic measurement request can be sent out using as a trigger the path change in the ATM network 390 which is used when the visitor location BS 312 is changed due to the roaming of the mobile station 309. This depends on the network configuration.

When a user VP is a common VP, the direction section 370 compares the measured traffic with the user state, and if the measured traffic exceeds the threshold value even though the user employs the common VP, the user VP is changed from the common VP to an individual VP.

As a trigger for switching from the common VP to the individual VP, tightening of the bandwidth of the common VP due to an increase in the traffic of the current users in the common VP can be used, so that switching to the individual VP is carried out beginning from the users employing greater bandwidth in the common VP.

Figure 3:
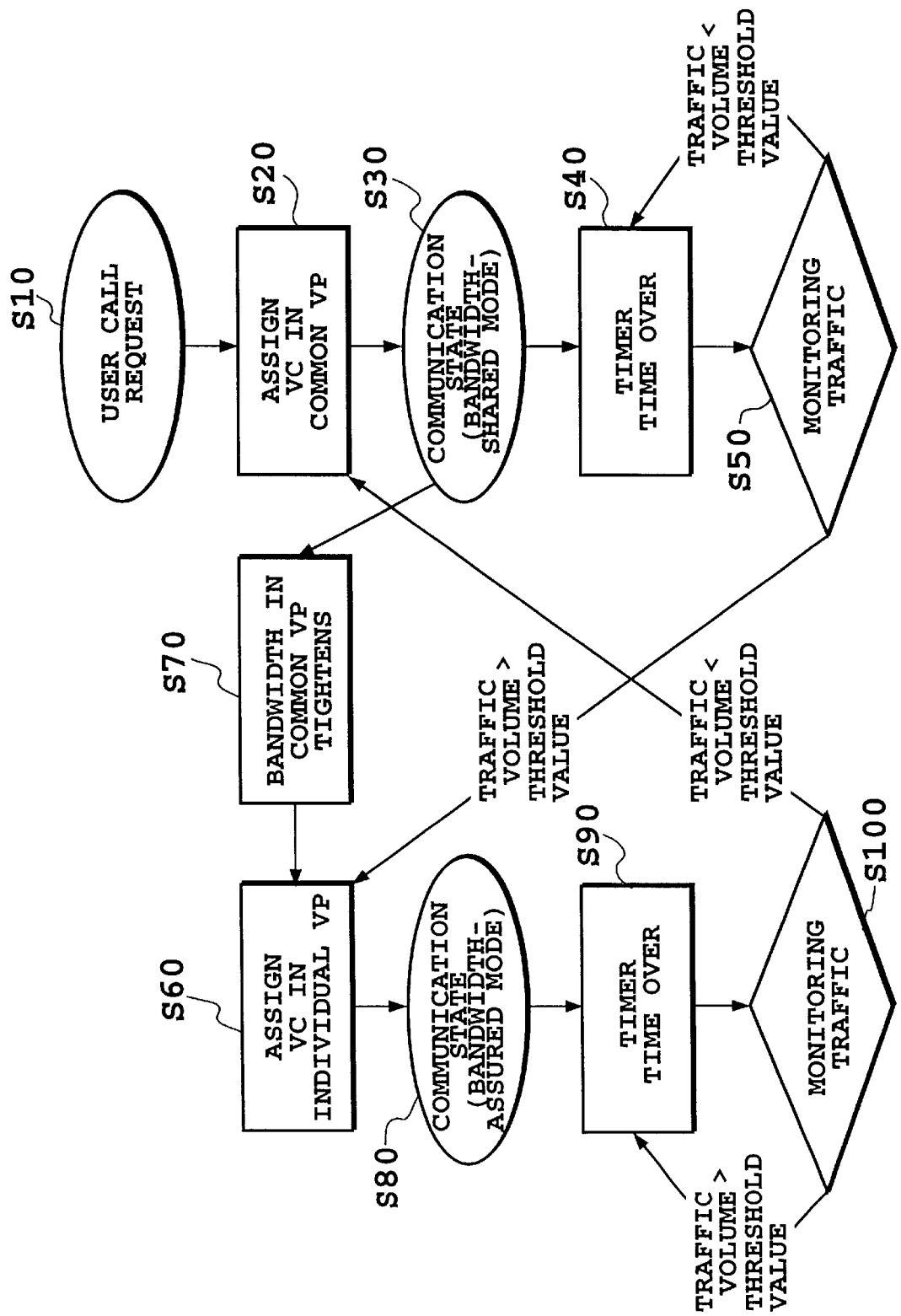
FIG. 3 is a state transition diagram of a switching operation in the mobile communications network as an embodiment in accordance with the present invention.

FIG. 3 is a state transition diagram of the present embodiment 2.

In FIG. 3, when a user call request takes place (S10), a VC in a common VP is assigned (S20). Thus, the communication state enters a bandwidth-shared mode (S30). When a predetermined time period has elapsed, and the time over of the timer takes place (S40), the traffic volume is monitored (S50). As long as the traffic volume<the threshold value, the processing is returned to step S40 to wait for the time over of the timer, but if the traffic volume>the threshold value, a VC in the individual VP is assigned (S60). Thus, the communication state enters a bandwidth-assured mode (S80). Alternatively, apart from the time over, a specified user can be shifted to the individual VP using the tightening of the bandwidth in the common VP as a trigger (S70). When the predetermined time period has elapsed, and the time over of the timer takes place in this state (S90), the traffic volume is monitored (S100). As long as the traffic volume>the threshold value, the processing is returned to step S90 to wait for the time over of the timer, but if the traffic volume<the threshold value, a VC in the common VP is assigned (S20). When the traffic volume=the threshold value at step S60, it is possible for the processing either to return to step S40 to wait or to proceed to step 60. Likewise, When the traffic volume =the threshold value at step S100, it is possible for the processing either to return to step S90 to wait or to proceed to step 20.

Furthermore, it is also possible to prevent fluttering of the switching by lowering the threshold B for switching to the common VP at step S100 as compared with the threshold A for switching to the individual VP at step 50.

As described above, according to the present invention, efficient use of the ATM transmission path becomes possible by multiplexing, into a bandwidth in the bandwidth-assured individual VPs, a plurality of users whose traffic volumes are beyond a predetermined value. In addition, installing bandwidth-unassured common VPs for low traffic users makes it possible to switch from the common VPs to the individual VPs or vice versa under the following conditions.

(1) When the user traffic volume, which is monitored at fixed intervals during the communications through an individual VP, drops below a particular threshold value, the individual VP is switched to a common VP.

(2) When the user traffic volume, which is monitored at fixed intervals during the communications through a common VP, exceeds a particular threshold value, the common VP is switched to an individual VP.

(3) In addition to the condition (2), when bandwidth shortage takes place in common VPs, the common VPs of heavy traffic users are switched to individual VPs.

Thus, effective bandwidth assurance can be achieved for the low traffic users in the common VPs.

Incidentally, although the time measuring section 375 and the direction section 370 are installed in the switching center (MSC) 317 in the foregoing embodiment 2 as shown in FIG. 2, they can be installed in the service control point (SCP).

In addition, in the embodiments 1 and 2, the direction sections 270 and 370, time measuring sections 275 and 375, state managing sections 280 and 396 can be installed separately in the traffic measuring sections 250, 260, 350, 355 and 360. In this case, the traffic measuring sections carry out the timer management, measurement.management and the state management independently, and when the switching between the individual VP and common VP is decided, matching of the VP used by each user can be made between the nodes by communicating between the connection managing sections of the nodes.

It is most preferable that the traffic measuring sections 250, 260, 350, 355 and 360 of the embodiments be provided separately for upward and downward connections of each link when establishing the connection. This is because the tight state of the common VP differs from link to link because the bandwidth of the established common VP or the users multiplexed into the common VP differ depending on the links between the nodes. Besides, when the user carry out asymmetric upward and downward communications, the traffic states differ between the upward and downward connections.

The common/individual bands used by the embodiments can be established, besides by using the VPs, by dividing the VP into several different bandwidths, and by setting one of them as a bandwidth-assured VC group (individual VC group), and another of them as a bandwidth-unassured VC group (common VC group). In this case, the common/individual bandwidth control is carried out for the VC groups.

INDUSTRIAL APPLICABILITY

As described above, the bandwidth control method of the packet data in the packet switching network and the packet switching network system in accordance with the present invention, can provide users with suitable bandwidths in accordance with the traffic volumes by switching during the communications between two routes consisting of the bandwidth-assured transmission connection and the bandwidth-shared transmission.connection. This makes it possible to implement the bandwidth control method of the packet data in the packet switching network and the packet switching.network system, which can utilize the network resources economically.

What is claimed is:

1. A bandwidth control method of packet data in a packet switching network for switching, in the packet switching network for transmitting packet data, a transmission connection for transmitting the packet data, said bandwidth control method comprising:

a monitoring step of monitoring a communication traffic volume of the packet data in the packet switching network; and a switching step of switching, in response to a result obtained by comparing the communication traffic volume with a predetermined threshold value, a connection used by a user terminal equipment between a bandwidth-assured transmission connection which ensures a communication bandwidth for each user terminal equipment transmitting the packet and a bandwidth-unassured transmission connection into which packet data of a plurality of user terminal equipments is multiplexed, and which transmits the packet data and does not ensure the communication bandwidth.

2. The bandwidth control method of packet data in the packet switching network as claimed in claim 1, wherein the packet switching network is an ATM switching network, the bandwidth-assured transmission connection which ensures the communication bandwidth for each user terminal equipment transmitting the packet is a connection established in a VC in an individual VP or in an individual VC group, and the bandwidth-unassured transmission connection is a connection established in a VC in a common VP or in a common VC group;

said monitoring step monitors the communication traffic volume of the packet data of the user terminal equipment in the ATM switching network; and said switching step switches, in response to the result obtained by comparing the communication traffic volume of the packet data of the user terminal equipment with the predetermined threshold value, the transmission connection used by the user terminal equipment between the VC in the individual VP or in the individual VC group and the VC in the common VP or in the common VC group.

3. The bandwidth control method of packet data in the packet switching network as claimed in claim 2, wherein said monitoring step comprises a measuring step of measuring the communication traffic volume; and said switching step comprises the steps of:

comparing, when the connection of the user terminal equipment is the VC in the individual VP or in the individual VC group, the communication traffic volume obtained at the monitoring step with a first predetermined threshold value, and issuing, when the communication traffic volume is less than the first predetermined threshold value, a command to change the connection used by the user terminal equipment from the VC in the individual VP or in the individual VC group to the VC in the common VP or in the common VC group;

comparing, when the connection used is the VC in the common VP or in the common VC group, the communication traffic volume obtained at the monitoring step with a second predetermined threshold value, and issuing, when the communication traffic volume is greater than the second predetermined threshold value, a command to change the connection used by the user terminal equipment from the VC in the common VP or in the common VC group to the VC in the individual VP or in the individual VC group; and changing the connection used by the user terminal equipment in response to the commands of the steps of issuing the commands to change.

4. The bandwidth control method of packet data in the packet switching network as claimed in claim 3, wherein the monitoring step further comprises a common VP or common VC group bandwidth monitoring step of measuring during communications a total traffic volume of users in the common VP or in the common VC group, or of measuring an idle capacity in the common VP or in the common VC group; and the switching step further comprises a step of changing, when result of said common VP or common VC group bandwidth monitoring step indicates that the bandwidth of the common VP or of the common VC group tightens, the connection of a user whose traffic is rather heavy in the common VP from the VC in the common VP or in the common VC group to the VC in the individual VP or in the individual VC group.

5. The bandwidth control method of packet data in the packet switching network as claimed in claim 3, wherein said ATM switching network is a mobile network comprising a base station to which said user terminal equipment is connected, a switching center to which the base station is connected, a gateway center to which the switching center is connected, and terminal equipment of an external network connected to the gateway center, and wherein said bandwidth control method further comprises the steps of:

establishing, when said user terminal equipment originates an outgoing call, a connection in the VC in the individual VP or individual VC group, or in the VC in the common VP or in the common VC group, between said base station in a visitor location of said user terminal equipment and said gateway center through said switching center; and establishing, when said user terminal equipment terminates an incoming call, a connection in the VC in the individual VP or individual VC group, or in the VC in the common VP or in the common VC group, between said gateway center and said base station to which said user terminal equipment is connected in accordance with a location of said user terminal equipment, the location being registered by said user terminal equipment.

6. The bandwidth control method of packet data in the packet switching network as claimed in claim 5, wherein the step of measuring the communication traffic volume starts a new measurement when said visitor location base station is changed by roaming of said user terminal equipment.

7. The bandwidth control method of packet data in the packet switching network as claimed in claim 5, wherein a VC in the common VP or in the common VC group is used when originating an outgoing call from said user terminal equipment, or when terminating an incoming call from an external ATM switching network.

8. A packet switching network system for switching, in a packet switching network for transmitting packet data, a transmission connection for transmitting the packet data, said packet switching network system comprising:
 monitoring means for monitoring a communication traffic volume of the packet data in the packet switching network; and
 switching means for switching, in response to a result obtained by comparing the communication traffic volume with a predetermined threshold value, a connection used by a user terminal equipment between a bandwidth-assured transmission connection which ensures a communication bandwidth for each user terminal equipment transmitting the packet and a bandwidth-unassured transmission connection into which packet data of a plurality of user terminal equipments is multiplexed, and which transmits the packet data and does not ensure the communication bandwidth.

9. The packet switching network system as claimed in claim 8, wherein
 the packet switching network is an ATM switching network, the bandwidth-assured transmission connection which ensures the communication bandwidth for each user terminal equipment transmitting the packet is a VC in an individual VP or in an individual VC group, and the bandwidth-unassured transmission connection is a VC in a common VP or in a common VC group, and wherein said packet switching network system comprises:
 monitoring means for monitoring the communication traffic volume of the packet data of the user terminal equipment in the ATM switching network; and
 packet switching means for processing the packet data of the user terminal equipment, said packet switching means switching, in response to the communication traffic volume, the transmission connection used by the user terminal equipment between the VC in the individual VP or in the individual VC group and the VC in the common VP or in the common VC group.

10. The packet switching network system as claimed in claim 9, wherein
 said monitoring means comprises:
 measuring means for measuring the communication traffic volume of the packet data of the user terminal equipment;
 state managing means for holding, for each user terminal equipment, VP or VC group types used by the user terminal equipment; and
 change direction means for comparing, when the connection type of the user terminal equipment said state managing means holds is the individual VP or the individual VC group, the communication traffic volume with a first predetermined threshold value, and issuing, when the communication traffic volume is less than the first predetermined threshold value, a command to change a connection setting used by the user terminal equipment from the VC in the individual VP or in the individual VC group to the VC in the common VP or in the common VC group, and comparing, when the connection type of the user terminal equipment said state managing means holds is the common VP or in the common VC group, the communication traffic volume with a second predetermined threshold value, and issuing, when the communication traffic volume is greater than the second predetermined threshold value, a command to change the connection setting used by the user terminal equipment from the VC in the common VP or in the common VC group to the VC in the individual VP or in the individual VC group, and wherein
 said packet switching means comprises means for changing the connection used by the user terminal equipment in response to the commands of said change direction means.

11. The packet switching network system as claimed in claim 10, wherein
 said monitoring means further comprises common VP or common VC group bandwidth monitoring means for measuring during communications a total traffic volume of users in the common VP or in the common VC group, or for measuring an idle capacity in the common VP or in the common VC group; and
 said packet switching means further comprises means for changing, when a result of said common VP or common VC group bandwidth monitoring means indicates that the bandwidth of the common VP or of the common VC group tightens, the connection of a user whose traffic is rather heavy in the common VP from the VC in the common VP or in the common VC group to the VC in the individual VP or in the individual VC group.

12. The packet switching network system as claimed in claim 10, wherein
 said ATM switching network is a mobile network comprising:
 a gateway center for connecting said ATM switching network with an external ATM switching network, and for identifying user terminal equipment of said ATM switching network from packet data sent from the external network; and
 service control means for location registration of the user terminal equipment, and wherein
 said packet switching means further comprises means for establishing, from a location provided from said service control means, in the VC in the individual VP or individual VC group, or in the VC in the common VP or in the common VC group, a connection between a base station connected to said user terminal equipment and said gateway center in said ATM switching network.

13. The packet switching network system as claimed in claim 12, wherein
 said means for measuring the communication traffic volume comprises means for starting a new measurement when said visitor location base station is changed by roaming of said user terminal equipment.

14. The packet switching network system as claimed in claim 12, wherein said packet switching means uses a VC in the common VP or in the common VC group when an outgoing call occurs from said user terminal equipment, or when an incoming call takes place from said external ATM switching network.

15. The bandwidth control method of packet data in the packet switching network as claimed in claim 1, wherein said monitoring steps comprises a measuring step of measuring the communication traffic volume; and said switching step comprises the steps of:

comparing, when the connection of the user terminal equipment is the bandwidth-assured transmission connection, the communications traffic volume obtained at the monitoring step with a first predetermined threshold value, and issuing, when the communication traffic volume is less then the first predetermined threshold value, a command to change the connection used by the user terminal equipment from the bandwidth-assured transmission connection to the bandwidth-unassured transmission connection comparing, when the connection used is the bandwidth-unassured transmission connection, the communication traffic volume obtained at the monitoring step with a second predetermined threshold value, and issuing, when the communication traffic volume is greater than the second predetermined threshold value, a command to change the connection used by the user terminal equipment from the bandwidth-unassured transmission connection to the bandwidth-assured transmission connection, and changing the connection used by the user terminal equipment in response to the commands of the steps of issuing the commands to change.

16. The packet switching network system as claimed in claim 8, wherein said monitoring means comprises:

measuring means for measuring the communication traffic volume of the packet data of the user terminal equipment;

state managing means for holding, for each user terminal equipment, a connection type used by the user terminal equipment; and change direction means for comparing, when the connection type of the user terminal equipment said state managing means holds is the bandwidth-assured transmission connection, the communication traffic volume with a first predetermined threshold value, and issuing, when the communication traffic volume is less than the first predetermined threshold value, a command to change a connection setting used by the user terminal equipment from the bandwidth-assured transmission connection to the bandwidth-unassured transmission connection, and comparing, when the connection type of the user terminal equipment said state managing means holds is the bandwidth-unassured transmission connection, the communication traffic volume with a second predetermined threshold value, and issuing, when the communication traffic volume is greater than the second predetermined threshold value, a command to change the connection setting used by the user terminal equipment from the bandwidth-unassured transmission connection to the bandwidth-assured transmission connection, and wherein said switching means comprises means for changing the connection used by the user terminal equipment in response to the commands of said change direction means.

\* \* \* \* \*

UNITED STATES PATENT AND TRADEMARK OFFICE
CERTIFICATE OF CORRECTION

PATENT NO. : 6,697,370 B1
DATED : February 24, 2004
INVENTOR(S) : Tokuro Doi et al.

It is certified that error appears in the above-identified patent and that said Letters Patent is hereby corrected as shown below:

Title page,
Item [56], References Cited, FOREIGN PATENT DOCUMENTS, add
-- EU    0522391A2    6/1992   H04Q/11/04 --
OTHER PUBLICATIONS, add -- DISTRIBUTED CHANNEL ALLOCATION IN ATM NETWORKS, Yoshiyasu Nishibe, Kazuhiro Kuwabara, Tatsuya Suda, Toru Ishida, NTT Communication Science Laboratories, pp. 417-423 --

Column 1,
Line 51, after "execute" change "witching" to -- switching --

Column 2,
Line 6, before "disadvantage" change "an" to -- a --

Column 5,
Line 8, after "changing the" change "connection-used" to -- connection used --
Line 26, after "network" change "may-be" to -- may be --

Column 6,
Line 47, before "description" insert -- a --

Column 9,
Line 64, before "threshold" change "volume<the" to -- volume < the --
Line 66, before "threshold" change "volume>the" to -- volume > the --

Column 10,
Line 7, after "traffic" change "volume>the" to -- volume > the --
Line 10, before "threshold" change "volume<the" to -- volume < the --
Line 11, before "threshold" change "volume=the" to -- volume = the --
Line 14, before "threshold" change "volume =the" to -- volume = the --
Line 51, after "management," change "measurement.management" to -- measurement management --
Line 64, after "user" change "carry" to -- carries --

UNITED STATES PATENT AND TRADEMARK OFFICE
CERTIFICATE OF CORRECTION

PATENT NO.    : 6,697,370 B1
DATED         : February 24, 2004
INVENTOR(S)   : Tokuro Doi et al.

It is certified that error appears in the above-identified patent and that said Letters Patent is hereby corrected as shown below:

Column 11,
Line 17, after "bandwidth-shared" change "transmission.connection" to
-- transmission connection --
Line 20, before "system" change "switching.network" to -- switching network --

Signed and Sealed this

Twenty-eighth Day of December, 2004

JON W. DUDAS
*Director of the United States Patent and Trademark Office*